United States Patent [19]

Baumgarten

[11] Patent Number: 4,798,100
[45] Date of Patent: Jan. 17, 1989

[54] AUTOMATIC ADJUSTMENT DEVICE FOR CABLE CONTROL SYSTEMS

[75] Inventor: John M. Baumgarten, Saline, Mich.

[73] Assignee: Babcock Industries Inc., Fairfield, Conn.

[21] Appl. No.: 98,235

[22] Filed: Sep. 18, 1987

[51] Int. Cl.$^4$ ............................................. F16C 1/10
[52] U.S. Cl. ........................ 74/501.5 R; 74/502.4; 192/111 A; 188/136 B; 403/19; 403/369; 403/374
[58] Field of Search ....... 74/501 R, 501.5 R, 501.5 H, 74/502, 503; 192/111 A, 30 W, 70.25; 188/196 B, 196 R, 265, 2 D; 340/52 R, 52 B; 403/19, 369, 374

[56] References Cited

U.S. PATENT DOCUMENTS

| | | | |
|---|---|---|---|
| 3,912,406 | 10/1975 | McGrath | 403/19 |
| 4,304,322 | 12/1981 | Beccaris | 192/111 A |
| 4,344,518 | 8/1982 | Gilmore | 192/111 A |
| 4,418,583 | 12/1983 | Taig | 74/501.5 R |
| 4,543,849 | 10/1985 | Yamamoto et al. | 74/501.5 R |
| 4,598,809 | 7/1986 | Glover et al. | 74/501.5 R |
| 4,658,668 | 4/1987 | Stocker | 74/501.5 R |
| 4,690,262 | 9/1987 | Hoyle | 192/111 A |
| 4,693,137 | 9/1987 | Deligny | 192/111 A X |
| 4,717,004 | 1/1988 | Hoyle | 192/111 A |
| 4,753,123 | 6/1988 | Stormont | 74/501.5 R |

FOREIGN PATENT DOCUMENTS

| | | | |
|---|---|---|---|
| 0234864 | 9/1987 | European Pat. Off. | 74/501.5 R |
| 2157789 | 10/1985 | United Kingdom | 74/501.5 R |

Primary Examiner—Richard E. Moore
Assistant Examiner—Vinh Luong
Attorney, Agent, or Firm—Barnes, Kisselle, Raisch, Choate, Whittemore & Hulbert

[57] ABSTRACT

An automatic control device for cable control systems comprising a first member adapted to be fixed, a second member connected to the conduit of a cable control system, and a third member interposed between the first member and the second member. The third member has one-way ratcheting teeth engaging complementary teeth on the first member. A spring is interposed between the third member and the second member. The second member includes circumferentially spaced helical teeth that engage complementary grooves in the first member. The second member further includes circumferentially spaced longitudinally extending ribs which engage the grooves of the third member. The device includes a mechanism for locking the parts together against longitudinal movement. When the mechanism is released, the force of the spring urges the second member axially away from the first member and the ratcheting teeth permit the second member to rotate relative to the first member, thereby elongating the conduit relative to a core element that extends through the first member and second member. After adjustment, the one way clutch defined by the ratchet teeth permits relative rotation in one direction only by preventing rotation between the third member and the first member thus preventing axial inward movement between the first member and second member. This retains the adjusted position.

6 Claims, 2 Drawing Sheets

AUTOMATIC ADJUSTMENT DEVICE FOR CABLE CONTROL SYSTEMS

This invention relates to cable control systems and particularly to automatic devices for such cable control systems.

BACKGROUND AND SUMMARY OF THE INVENTION

In cable control systems comprising a conduit and a core element movable relative to the conduit, it is desirable to be able to adjust the length of the system after it is installed, for example, in an automobile as in a clutch control system, throttle control system, brake control system or pull control system.

Typical adjustment devices are shown, for example. in U.S. Pat. No. 4,378,713, U.S. application Ser. No. 832,526 filed Feb. 21, 1986 abandoned and became co-pending File Wrapper Continuation (F.W.C.) application Ser. No. 07/120,721 filed on Nov. 6, 1987, and U.S. application Ser. No. 917,914 filed Oct. 10, 1986, abandoned and became F.W.C. application Ser. No. 07/131,274 filed on Dec. 9, 1987 now U.S. Pat. No. 4,762,017 issued on Aug. 9, 1988 having a common assignee with the present application.

Among the objectives of the present invention are to provide an automatic adjustable device for cable control systems which can be readily activated after installation of the cable control system to adjust the tension automatically; which will automatically further adjust throughout the life of the cable control system continuously to accommodate changes, which can be readily disassembled, rearmed and reactivated without damaging the device; which is simple; which does not require special tools and which does not require a great deal of training to install or repair.

In accordance with the invention an automatic control device for cable control systems comprises a first member adapted to be fixed, a second member connected to the conduit of a cable control system, and a third member interposed between the first member and the second member. The third member has one-way ratcheting teeth engaging complementary teeth on the first member. A spring is interposed between the third member and the second member. The second member includes circumferentially spaced helical threads that engage complementary grooves in the first member. The second member further includes circumferentially spaced longitudinally extending ribs which engage the grooves of the third member. The device includes a mechanism for locking the parts together against longitudinal movement. When the mechanism is released, the force of the spring urges the second member axially away from the first member and the ratcheting teeth permit the second member to rotate relative to the first member, thereby elongating the conduit relative to a core element that extends through the first member and second member. After adjustment, the one way clutch defined by the ratchet teeth permits relative rotation in one direction only by preventing rotation between the third member and the first member thus preventing axial inward movement between the first member and second member. This retains the adjusted position.

DESCRIPTION

Figure 1:
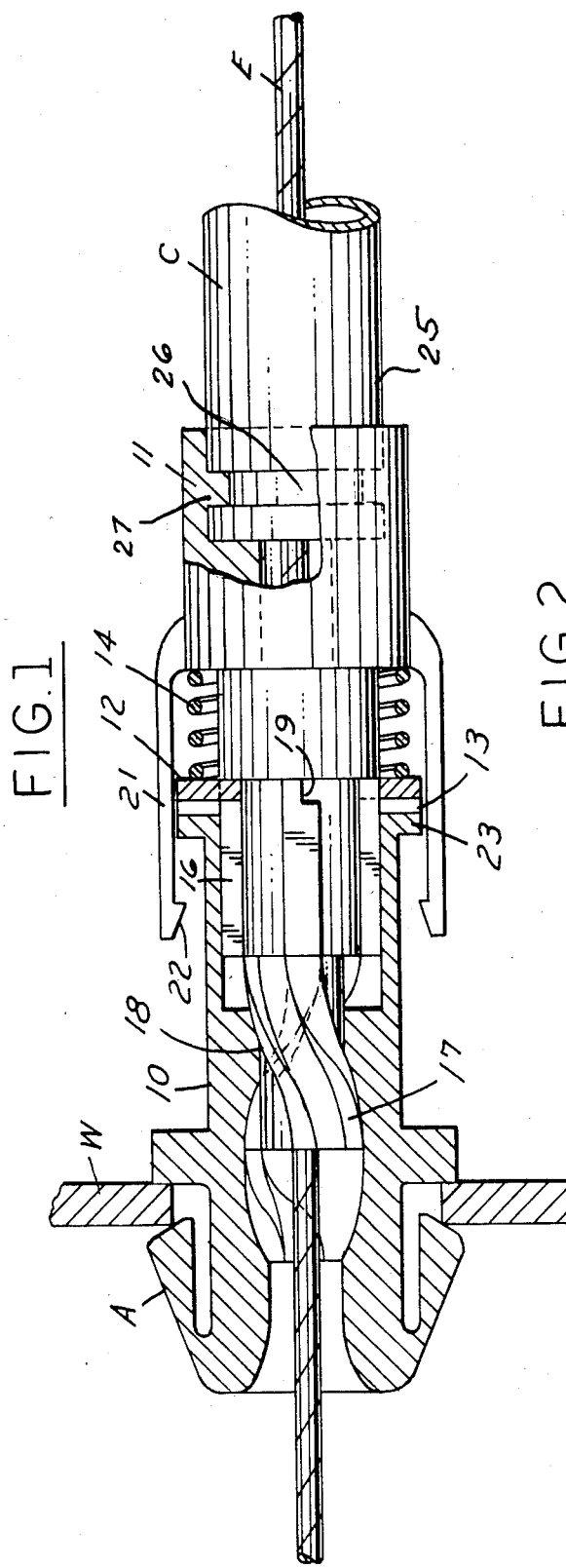
FIG. 1 is a art sectional longitudinal view of a cable control system including the automatic cable control device.
Figure 2:
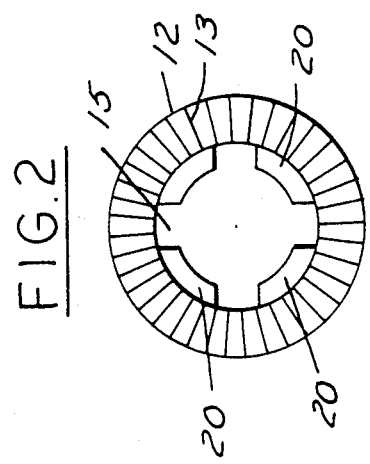
FIG. 2 is a plan view of a portion of the system.
Figure 3:
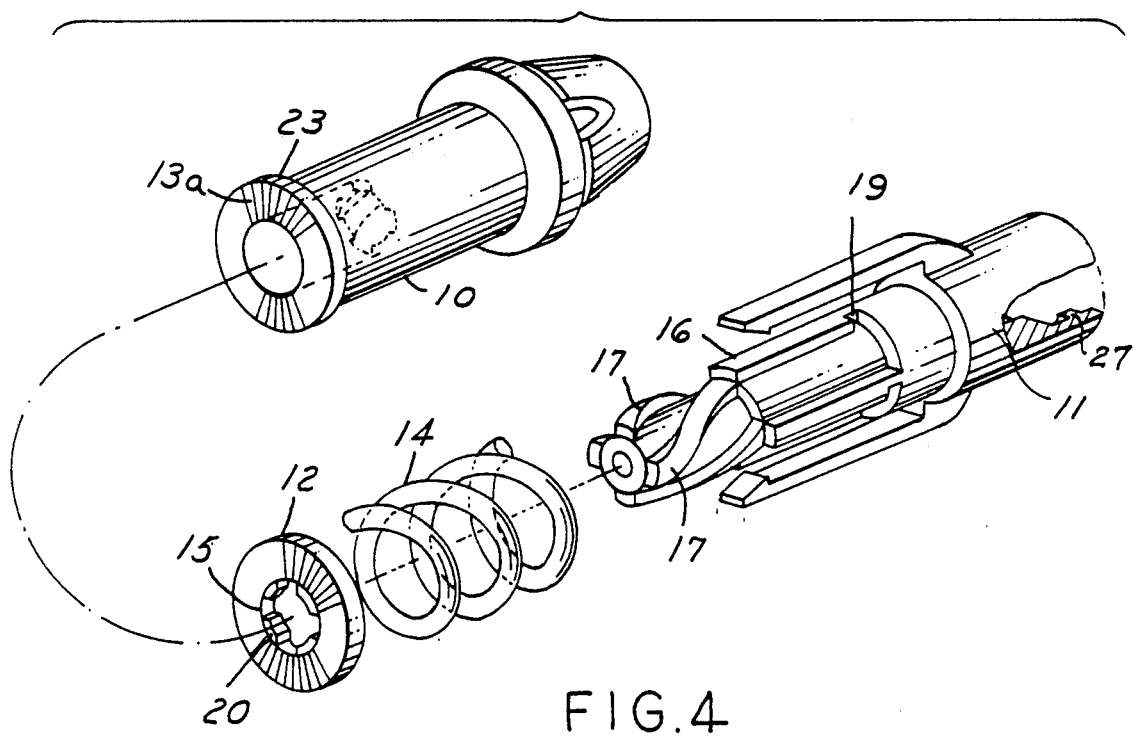
FIG. 3 is an exploded perspective view of the automatic cable control device.
Figure 4:
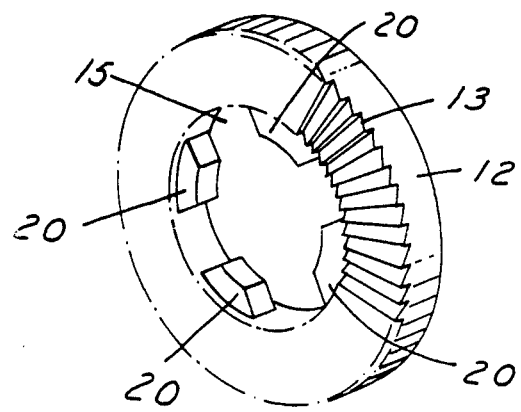
FIG. 4 is a perspective view of the element shown in FIG. 2.

Referring to the drawings, the cable control device embodying the invention is adapted to be utilized with a cable control system that uses a conduit C and a core element E. The device includes a first member 10 that can be made of plastic or metal and is adapted to be mounted on a fixed wall W by end fittings such as elastically deflectable arms A. The member 10 is generally tubular and is associated with a second member 11 that is also generally tubular and the core element E is adapted to pass through the members 10, 11. The device further includes a third member 12 in the form of a ring that has one way ratcheting teeth 13 that are associated with an annular array of complementary one way ratcheting teeth 13a from the member 10. A spring 14 is interposed between the ring 12 and the member 11 tending to urge the members 10, 11 axially apart.

The ring 12 further includes slots 15 which are engaged by circumferentially spaced longitudinally extending ribs or teeth 16 on the exterior of the member 11 to prevent rotation of the ring 12 relative to the member 11. Member 11 further includes circumferentially spaced helical teeth 17 that extend into engagement with complementary helical grooves 18 in the first member 10. The member 11 further includes notches 19 at the ends of the teeth or ribs 16 into which projections 20 which form the grooves 15 can be inserted by relative rotation between the ring 12 and the member 11 to arm the device for assembly purposes in the cable control system. Integral molded spring arms 21 extends longitudinally from member 11 and are adapted to swing and have teeth 22 adapted to engage a flange 23 on member 10 to prevnet inadvertent axial disassembly. The ribs 16 have a greater outer diameter than the outer diameter of helical teeth 17 to facilitate molding when second member 11 is made of plastic molding or of metal by die-casting.

Preferably conduit C is connected to second member 11 by means which permits the relative rotation between second member 11 relative to the conduit C. Specifically, conduit C has a swivel member 25 mounted thereon having an annular groove 26 engaged by an annular rib 27 extending into said groove 26. Such an arrangement shields any torsional affects on the conduit C from the adjustment device thereby providing a more precise adjustment.

The device in the assembled condition as shown in FIG. 1 is shown with the ribs 20 engaging the notches 19 is placed in the cable control system with the core element E passing therethrough. Once the cable control system is installed, as in a vehicle, to activate the device, the ring 12 is twisted to move the projections 20 out of engagement with the notches 19. This permits the force of the spring 14 to move the members 10, 11 axially away from one another. As a result of the helical grooves, the member 11 will rotate relative to the member 10 in one direction only as permitted by the one-way clutch formed by the teeth 13a on member 10 and teeth 13 on ring 12. After adjustment, the one way clutch defined by the ratchet teeth permits relative rotation in one direction only by preventing rotation between the third member 12 and the first member 10 thus preventing axial inward movement between the first member 10 and second member 11. This retains the adjusted position.

Although the invention has been described as used between lengths of conduit, it can be also used between the ends of cable.

I claim:

1. An automatic control device for cable control systems comprising
   a first member adapted to be fixed,
   a second member adapted to be connected to a conduit of a cable control system,
   a third member interposed between the first and second members,
   means between said first member and said third member defining a one-way clutch,
   spring means interposed between said third member and said second member,
   said second member including circumferentially spaced helical teeth that engage complementary grooves in said first member,
   said second member further including circumferentially spaced longitudinally extending ribs having ends aligned with ends of the helical teeth wherein said ribs engage circumferentially spaced grooves of said third member,
   such that when the device is released, the force of the spring means urges the second member axially away from the first member and the one way clutch permits the second member to rotate relative to the first member in one direction only and prevents the second member from moving axially inwardly relative to said first member.

2. The automatic control device set forth in claim 1 wherein said one-way clutch comprises one-way ratcheting on said first member and one way ratcheting teeth on said third member.

3. The automatic control device set forth in claim 1 including releasable means for locking first member and second member against axial outward movement to prevent inadvertent disassembly of the device.

4. The automatic control device set forth in claim 3 wherein said releasable means comprises integral axially extending arms on said second member having radial teeth engaging said first member.

5. The automatic control device set forth in claim 1 wherein said second member is adapted to be connected to said conduit and said first, second and third members have aligned openings for passage of a core element.

6. The automatic control device set forth in any of claims 1-5 including interengaging means between said conduit and said second member providing relative rotation between said conduit and said second member.

* * * * *